July 23, 1929.  C. E. ROWE  1,721,793
DRAFTING INSTRUMENT
Filed Sept. 8, 1925
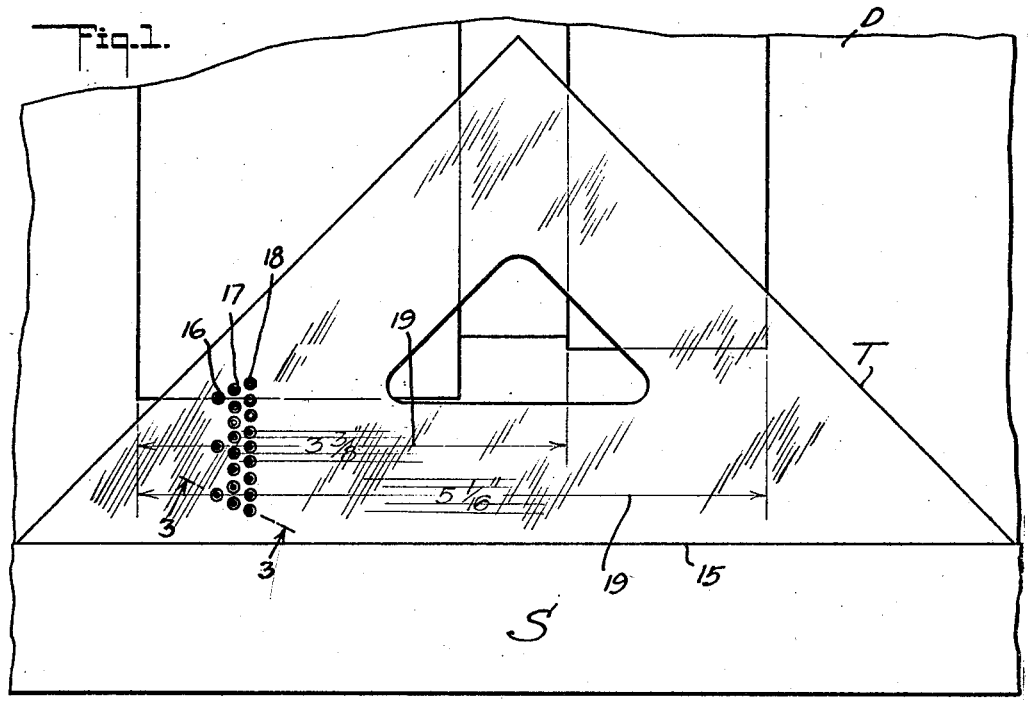
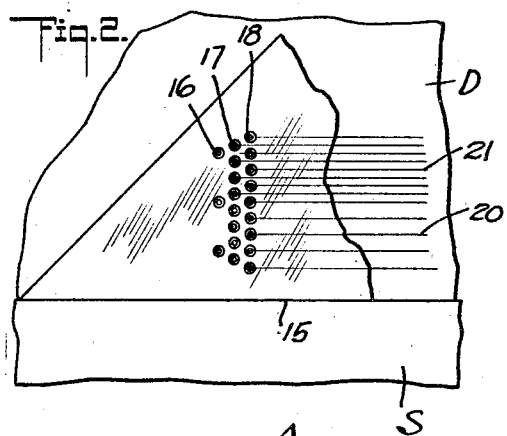
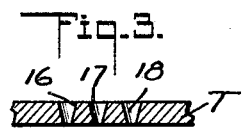
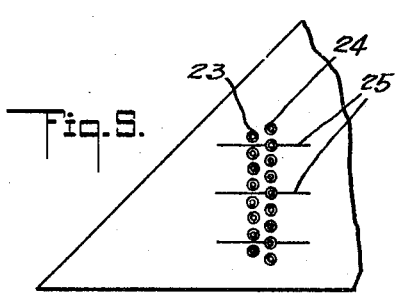
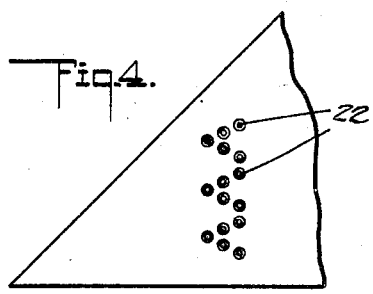
INVENTOR.
CHARLES E. ROWE
BY Munn & Co.
ATTORNEYS.

Patented July 23, 1929.

1,721,793

UNITED STATES PATENT OFFICE.

CHARLES E. ROWE, OF AUSTIN, TEXAS.

DRAFTING INSTRUMENT.

Application filed September 8, 1925. Serial No. 55,097.

My invention relates to drafting instruments, and it is a purpose of my invention to provide a drafting instrument adapted for use in conjunction with a T-square or other straight-edge, and provided with a straight edge and a plurality of apertures, any one of which is adapted to receive a pencil point to permit it to have marking contact with a sheet of paper when superimposed thereon, so that as the instrument slides along the T-square the pencil will scribe a line on the paper and at any predetermined distance from the T-square depending upon in which aperture the pencil point is disposed.

It is also a purpose of my invention to provide a drafting instrument of the above described character in which the arrangement of apertures is such as to facilitate the scribing and predetermined spacing of dimension lines on a mechanical or working drawing, the scribing of the boundary lines for dimension numerals of predetermined sizes and their fractions, and the formation and predetermined and uniform spacing of cross hatching on drawings. The instrument is of value in teaching students of drafting the proper technique in dimensioning a working drawing.

I will describe only one form of drafting instrument and three arrangements of apertures, all embodying my invention, and will then point out the novel features thereof in claims.

In the accompanying drawings,

Figure 1 is a view showing in plan one form of drafting instrument embodying my invention in applied position with respect to a T-square and drawing;

Figure 2 is a fragmentary view similar to Figure 1, showing the same arrangement of apertures but illustrating their use in the scribing of lines spaced apart different distances for use as guide lines of lettering or cross hatching of a drawing;

Figure 3 is a fragmentary sectional view taken on the line 3—3 of Figure 1;

Figure 4 is a fragmentary view of a drafting instrument showing another arrangement of apertures and embodying my invention;

Figure 5 is a view similar to Figure 4, showing still another arrangement of apertures and markings embodying my invention.

Referring specifically to the drawings, in which similar reference characters refer to similar parts in each of the views, and particularly to Figure 1, I have here shown one form of drafting instrument embodying my invention which is in the form of a triangle, designated at T, and constructed preferably of transparent material, so that the lines scribed on the drawing can be observed through the instrument, as will be understood. It is not essential to my invention that the instrument be in the form of a triangle, it being only necessary that the instrument be provided with a straight edge, indicated at 15, so that the instrument may have sliding contact with the edge of a T-square S which is shown in applied position upon a sheet of drawing D.

Adjacent one corner of the triangle T, preferably the left hand corner, are a plurality of apertures, preferably of frusto-conical form, as shown in Figure 3, to receive the tapered point of a pencil or other marking instrument. In Figure 1, the apertures are in three columns, designated 16, 17 and 18, respectively, and these columns are preferably formed perpendicularly with respect to the straight edge 15. The apertures in the columns vary in number, the column 16 containing three apertures, the column 17 eight apertures, and the column 18 nine apertures. The apertures of any one column are in staggered relation to the apertures of an adjacent column, while it will be noted that certain of the apertures of the column 18 are in horizontal alinement with the apertures of the column 16. The apertures of the column 16 and the alined apertures of the column 18 are used in the scribing of dimension lines, designated at 19, for mechanical or working drawings. The apertures of the column 17 are used in scribing the boundary lines for the dimension numerals, and the remaining apertures of the column 18 are for scribing the boundary lines for the fractions of the dimension numerals. The uses of the several columns of apertures have been clearly illustrated in Figure 1, and it will be noted that the several apertures are arranged in groups of six each and that the apertures of any one group cooperate in forming a dimension line and the dimension numeral and its fraction for such dimension line.

In the use of the drafting instrument, one hole of column 16 may be placed on the outline of the drawing, then the triangle is slid along the edge of the T-square with a pencil or other marking instrument inserted into the desired aperture whereby the pencil point will have marking contact with the sheet of paper D so that upon sliding of the triangle the pencil will be caused to scribe a line on the drawing. By the successive use of the instrument in this manner, the several lines for one or more dimension lines and the boundary lines for the corresponding dimension numerals and their fractions can be formed. By providing the several triangular groups of apertures, a plurality of dimension lines and the numeral boundary lines can be formed without disturbing the position of the T-square.

In Figure 1 the use of the instrument is illustrated for scribing dimension lines on a drawing in the position known to the drafting profession as "horizontal". If the straight edge of the instrument be slid in contact with the vertical edge of a draftsman's conventional triangle which is in contact with the edge 15 of the T-square, dimension and boundary lines will be scribed perpendicular to the edge of the T-square.

Referring now to Figure 2, the drafting instrument here shown is the same as in Figure 1, the lines 20 and 21 scribed on the drawing D illustrating the use of the apertures in the formation of two sets of equally spaced lines.

In Figure 4, I have illustrated another arrangement of apertures, still adhering to the principle of three columns of apertures but with the apertures of the columns arranged to form a zigzag series of apertures designated at 22. This arrangement of apertures can be used in a manner similar to that described in connection with the invention as illustrated in Figure 1.

In Figure 5 I have shown two columns of apertures designated at 23 and 24, with the apertures of the two columns arranged in staggered relation to each other, and certain of the apertures of the column 24 intersected by lines 25 formed on the instrument and designating the apertures for use in the scribing of dimension lines. The apertures adjacent any one line 25 are employed in the scribing of the boundary lines for the dimension numerals and their fractions, as will be understood. It will be clear that any other suitable markings to designate the spacing of dimension lines may be employed in lieu of the apertures 16 or lines 25.

Although I have herein shown and described only one form of drafting instrument and three arrangements of apertures, all embodying my invention, it is to be understood that various changes and modifications may be made therein without departing from the spirit of the invention and the spirit and scope of the appended claims.

I claim as my invention:

1. A drafting instrument having a straight edge and a plurality of pencil point receiving apertures to permit scribing of lines upon a drawing upon movement of the instrument over the drawing, said apertures being arranged in three parallel columns perpendicular to said straight edge, the spacing between apertures in two of the columns being identical and the spacing between apertures in the remaining column being greater than and a multiple of the spacing in said two columns, the apertures of adjacent columns being arranged symmetrically in staggered relation.

2. A drafting instrument having a straight edge and a plurality of pencil point receiving apertures to permit scribing of lines upon a drawing upon movement of the instrument over the drawing, said apertures being arranged in triangular shaped groups with an aperture at the apex of each of the groups adapted to be utilized for the drawing of dimension lines, the other apertures of each of the groups being arranged along the sides of the latter and equally spaced from the apex aperture and each other, said groups of apertures being related to said straight edge in such manner that guide lines for whole numbers and fractions can be drawn at opposite sides of and equidistant from the dimension lines.

3. A drafting instrument having a straight edge and a plurality of pencil point receivng apertures to permit scribing of lines upon a drawing upon movement of the instrument over the drawing, said apertures being arranged in triangular shaped groups of at least five apertures each with an aperture at the apex of each of the groups adapted to be utilized for the drawing of dimension lines, the other apertures of each of the groups being arranged along the sides of the latter and equally spaced from the apex apertures and each other, said groups of apertures being related to said straight edge in such manner that guide lines for whole numbers and fractions can be drawn at opposite sides of and equidistant from the dimension lines.

CHARLES E. ROWE.